United States Patent [19]

Ichikawa et al.

[11] Patent Number: 5,314,648
[45] Date of Patent: May 24, 1994

[54] TIRE VULCANIZING MACHINE AND METHOD

[75] Inventors: Katsumi Ichikawa; Keiji Ozaki; Hisanori Ohshiba, all of Takasago, Japan

[73] Assignee: Kabushiki Kaisha Kobe Seiko Sho, Kobe, Japan

[21] Appl. No.: 991,598

[22] Filed: Dec. 16, 1992

[30] Foreign Application Priority Data

Dec. 16, 1991 [JP] Japan ............................ 3-353305
Dec. 16, 1991 [JP] Japan ............................ 3-353306

[51] Int. Cl.$^5$ ............................ B29C 35/00
[52] U.S. Cl. ............................ 264/40.5; 264/315; 264/326; 425/29; 425/33; 425/38; 425/150; 425/162
[58] Field of Search ............ 425/33, 38, 58, 150, 425/29, 162; 264/315, 326, 40.5, 40.1

[56] References Cited

U.S. PATENT DOCUMENTS

| | | | |
|---|---|---|---|
| 3,530,533 | 9/1970 | Turk et al. | 425/38 |
| 3,790,656 | 2/1974 | Getz | 425/38 |
| 3,890,073 | 6/1975 | Getz | 425/33 |
| 4,391,769 | 7/1983 | Ichikawa et al. | 264/326 |
| 4,669,964 | 6/1987 | Amano et al. | 425/35 |
| 4,695,234 | 9/1987 | Amano et al. | 425/23 |
| 4,702,669 | 10/1987 | Ichikawa et al. | 425/38 |
| 4,804,318 | 2/1989 | Fujieda et al. | 425/34.1 |
| 4,834,636 | 5/1989 | Ichikawa et al. | 425/38 |
| 4,874,303 | 10/1989 | Ichikawa et al. | 425/33 |
| 4,927,344 | 5/1990 | Amano et al. | 425/28.1 |
| 4,950,141 | 8/1990 | Maikuma et al. | 425/33 |

Primary Examiner—Jeffery Thurlow
Assistant Examiner—Mathieu Vargot
Attorney, Agent, or Firm—Oblon, Spivak, McClelland, Maier & Neustadt

[57] ABSTRACT

A tire vulcanizing machine includes a bladder; an upper clamping ring for holding the upper end of the bladder; an upper clamping ring for holding the upper end of the bladder; a first lifting mechanism for vertically moving the lower clamping ring; a second lifting mechanism for vertically moving the upper clamping ring; a loader for holding a green tire so as to surround the bladder extended between the upper and lower clamping rings with the horizontal center plane of the green tire in coincidence with the middle point between the upper and lower ends of the bladder; a third lifting mechanism for vertically moving the loader; and a controller for controlling the operation of the first, second and third lifting mechanisms. When shaping the green tire, the strokes of the first and second lifting mechanisms and the vertical position of the loader are detected respectively by first, second and third position detectors, and the controller controls the operation of the first and second lifting mechanisms according to detection signals provided by the first and second position detectors so that the upper and lower clamping rings are moved synchronously toward each other respectively at equal moving speeds and the horizontal center plane of the green tire is kept in coincidence with the middle point between the upper and lower ends of the bladder.

3 Claims, 5 Drawing Sheets

TIRE VULCANIZING MACHINE AND METHOD

BACKGROUND OF THE INVENTION

1. Field of the Invention

The present invention relates to a tire vulcanizing machine and, more specifically, to a tire vulcanizing machine capable of vulcanizing a tire in a high quality at a relatively low cost by symmetrically expanding a bladder inserted with green tire symmetrically with respect to its horizontal center plane for shaping.

2. Description of the Prior Art

Referring to FIG. 5 showing a conventional tire vulcanizing machine of a bottom shaping type for shaping a green tire, a bottom mold 53 is held on a bottom mold holder 52 supported on a base frame 51, and a vertically movable loader 55 having a chuck 54 sets a green tire 56 in the bottom mold 53 for shaping. A central mechanism 58 is extended axially through a guide sleeve 59 attached to the central portion of the bottom mold holder 52. The central mechanism 58 comprises a lifting cylinder 60 axially movably inserted in the guide sleeve 59, a cylinder actuator 69 provided with a piston rod 61 extending through the lifting cylinder 60, an upper clamping ring 63 attached to the upper end of the piston rod 61, a lower clamping ring 65 disposed coaxially under the upper clamping ring 63 and fixed to the upper end of the lifting cylinder 60, a bladder 67, an upper bead ring 64 fastening the upper end of the bladder 67 to the upper clamping ring 63, a lower bead ring 66 fastening the lower end of the bladder 67 to the lower clamping ring 65, and a swing arm 68 for vertically moving the lifting cylinder 60 together with the piston rod 61. The piston rod 61 is moved vertically to move the upper clamping ring 63 vertically and the lifting cylinder 60 is moved vertically to move the lower clamping ring 65 vertically.

In shaping a green tire by the tire vulcanizing machine thus constructed, the lifting cylinder 60 is set at its lowermost position to place the lower clamping ring 65 at its lowermost position, and the piston rod 61 is fully extended to place the upper clamping ring 63 at its uppermost position to extend the bladder 67 taut on the bottom mold 53 coaxially with the bottom mold 53 as indicated by alternate long and two short dashes lines in FIG. 5. The loader 55 holding a green tire 56 with the chuck 54 is lowered to seat the green tire 56 on the bottom mold 53. After the green tire 56 has been seated on the lower mold 53, a pressurized fluid, such as steam or a hot gas is supplied into the bladder 67 to expand the bladder 67 and the piston rod 61 is lowered as the bladder 67 is expanded to lower the upper clamping ring 63. The bladder 67 expands gradually, conforming to the shape of the inner surface of the green tire 56. Finally the bladder 67 conforms closely to the inner surface of the green tire 56 for shaping. After the green tire 56 has perfectly been shaped, a top mold, not shown, is joined to the bottom mold 53, and then the green tire 56 is subjected to vulcanization.

Such a mode of shaping the green tire on the prior art tire vulcanizing machine is called generally a bottom shaping mode. Since the bladder 67 is expanded by supplying a pressurized fluid into the bladder 67 and the upper clamping ring 63 is lowered as the bladder 67 is expanded so that the bladder 67 is inserted in the green tire 56 in the bottom shaping mode, the bladder 67 is expanded somewhat asymmetrically with respect to the horizontal center plane thereof as the same is inserted in the green tire 56. Consequently, the green tire 56 is shaped asymmetrically with respect to its horizontal center plane and it is impossible to obtain a tire of a high quality. An invention disclosed in Japanese Patent Laid-open (Kokai) No. Sho 56-148539 employs a tire vulcanizing machine of a center shaping type. In the operation of the tire vulcanizing machine of a center shaping type, upper and lower clamping rings are located near the horizontal center plane of a bladder, and then the upper and lower clamping rings are moved away from each other, supplying a pressurized fluid into the bladder having opposite ends attached respectively to the upper and lower clamping rings. Since the bladder is expanded symmetrically with respect to the horizontal center plane thereof as the bladder is inserted in the green tire, the vulcanized tire is symmetrical with respect to the horizontal center plane thereof. Thus a tire of a high quality can be obtained.

The tire vulcanizing machine of a center shaping type that operates in the center shaping mode, however, needs a bottom mold holder provided with a cylindrical well formed in its central portion to accommodate the bladder having opposite ends attached respectively to the upper and lower clamping rings, and a lower bead ring capable of being vertically moved relative to the lower clamping ring. Thus, the tire vulcanizing machine needs a central mechanism of a complicated construction, which increases the cost of the tire vulcanizing machine.

SUMMARY OF THE INVENTION

The present invention has been made in view of the foregoing problems in the prior art and it is therefore an object of the present invention to provide a tire vulcanizing machine capable of producing a tire of a high quality at a relatively low cost.

In one aspect of the present invention, a tire vulcanizing machine comprises: a lower clamping ring for holding the lower end of a bladder; a lower bead ring for fastening the lower end of the bladder the lower clamping ring; a first lifting mechanism for vertically moving the lower clamping ring; an upper clamping ring for holding the upper end of the bladder; a second lifting mechanism for vertically moving the upper clamping ring; and a loader provided with a chuck, for locating a green tire so as to surround the bladder after the bladder has been extended by separating the upper and lower clamping rings from each other. The tire vulcanizing machine is characterized in that position detectors are placed in connection with the first and second lifting mechanisms to control the operation of the first and second lifting mechanisms so that the upper and lower clamping rings approach each other synchronously, a position detector is placed in connection with the loader provided with the chuck to position the loader properly relative to the upper and lower clamping rings.

Since the upper and lower clamping rings are moved synchronously toward each other as a pressurized fluid is supplied into the bladder to insert the bladder in the green tire located at the middle between the opposite ends of the extended bladder, the bladder can be expanded symmetrically with respect to the horizontal center plane thereof similarly to the bladder expanded in the center shaping mode. Thus, a tire of a high quality can be produced. Furthermore, the tire vulcanizing machine of the present invention can readily be constructed by placing position detectors in connection with the cylinder actuator and the loader of the conventional tire vulcanizing machine of a bottom shaping type.

BRIEF DESCRIPTION OF THE DRAWINGS

The above and other objects, features and advantages of the present invention will become more apparent from the following description taken in connection with the accompanying drawings, in which.

DETAILED DESCRIPTION OF THE PREFERRED EMBODIMENTS

Figure 3A:
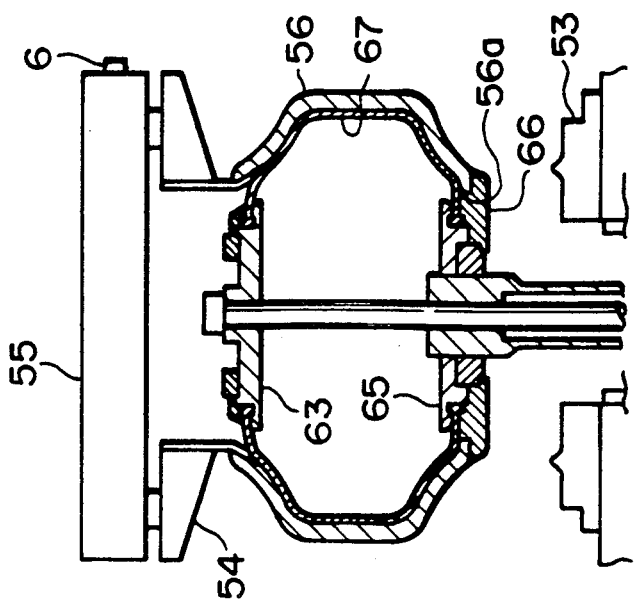
FIGS. 3(a), 3(b) and 3(c) are partly sectional front views of assistance in explaining the operation of the tire vulcanizing machine of FIG. 1.
Figure 3B:
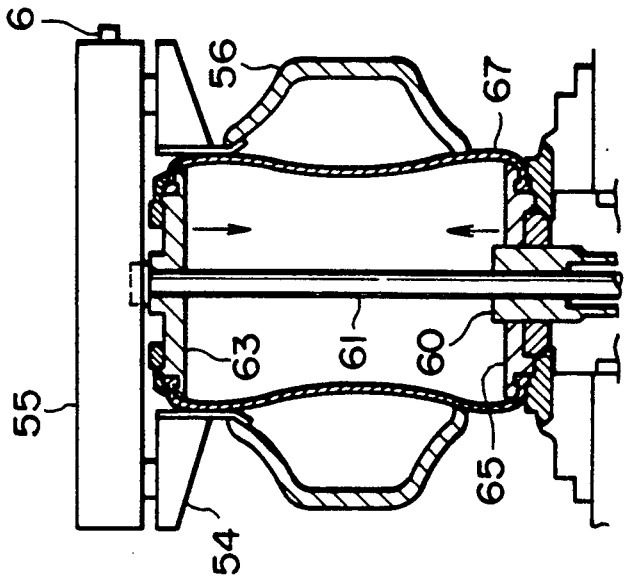
Figure 3C:
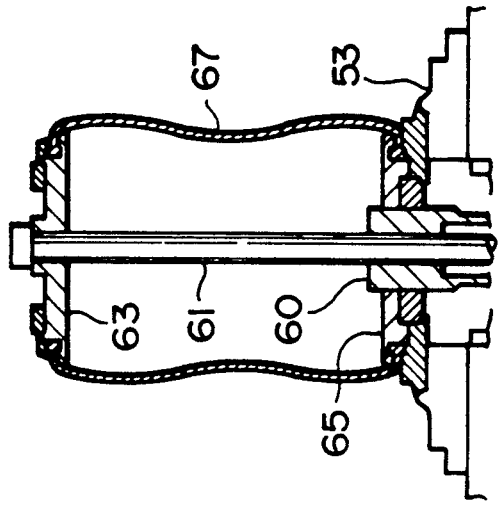
Figure 4:
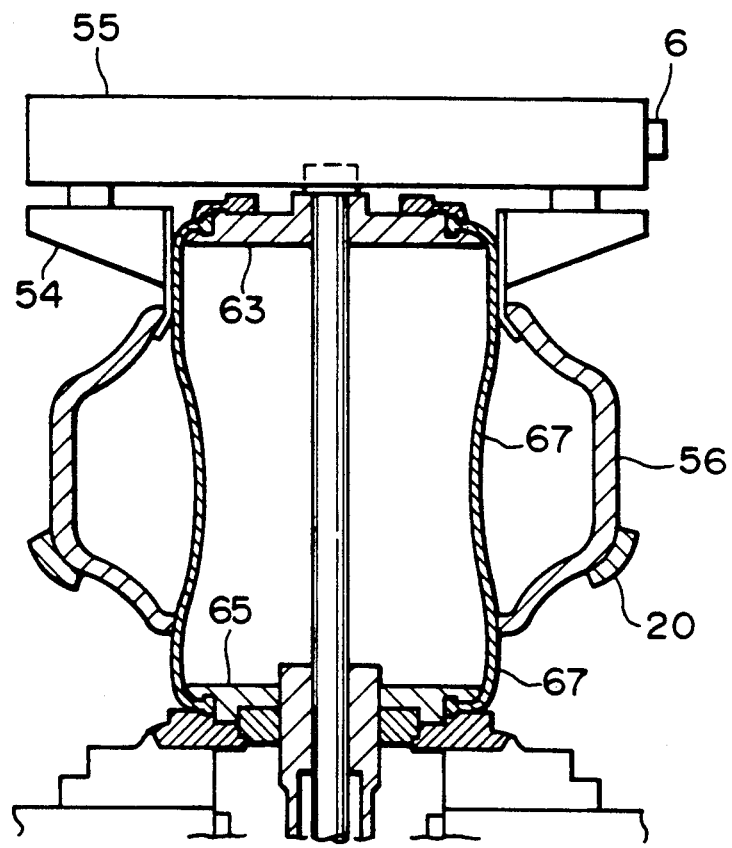
FIG. 4 is a partly sectional front view of a green tire holding member included in the tire vulcanizing machine of FIG. 1.
Figure 5:
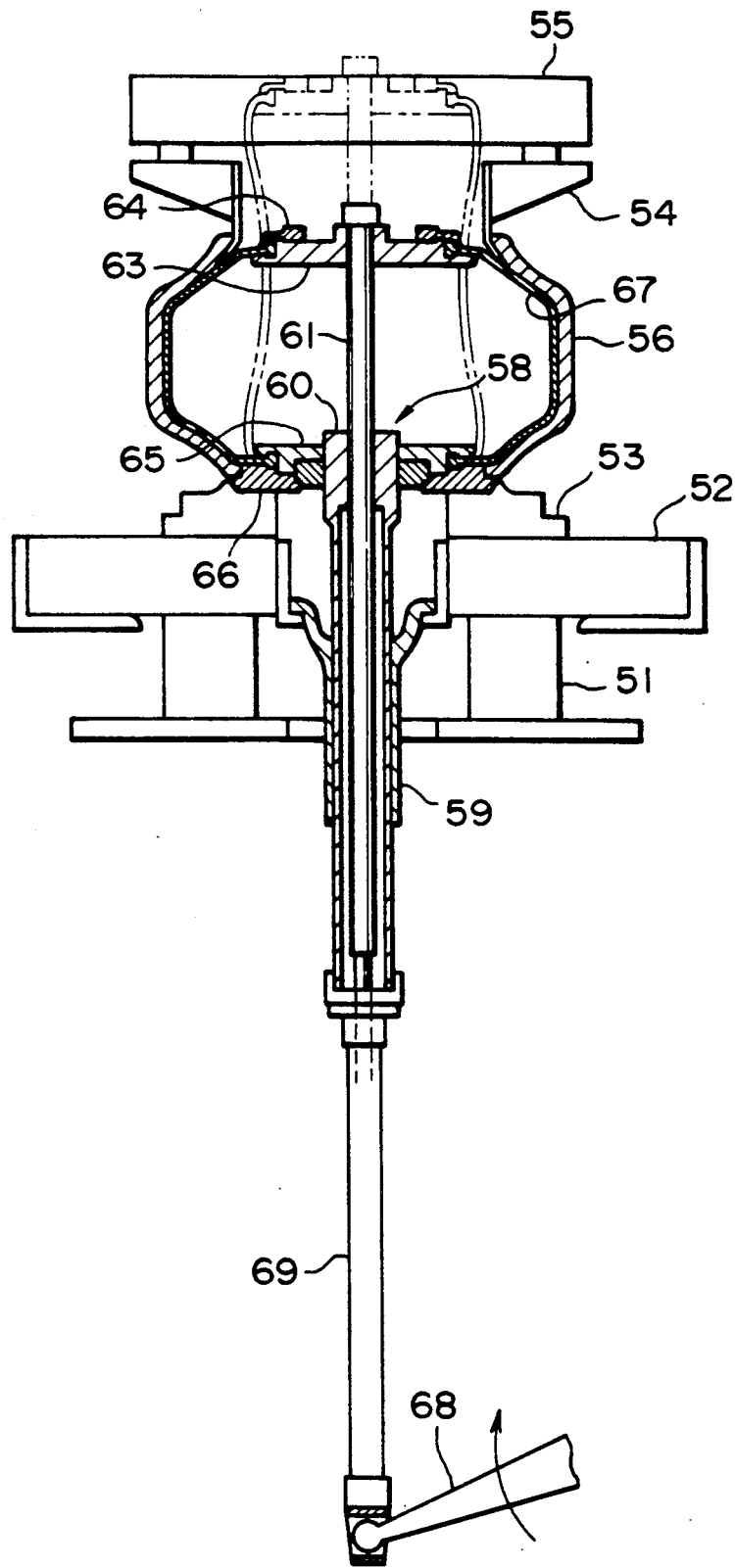
FIG. 5 is a partly sectional front view of a prior art tire vulcanizing machine of a bottom shaping type.

A tire vulcanizing machine in a first embodiment according to the present invention will be described hereinafter with reference to FIGS. 1 to 4, in which parts like or corresponding to those previously described with reference to FIG. 5 are denoted by the same reference characters and the description thereof will be omitted.

Figure 1:
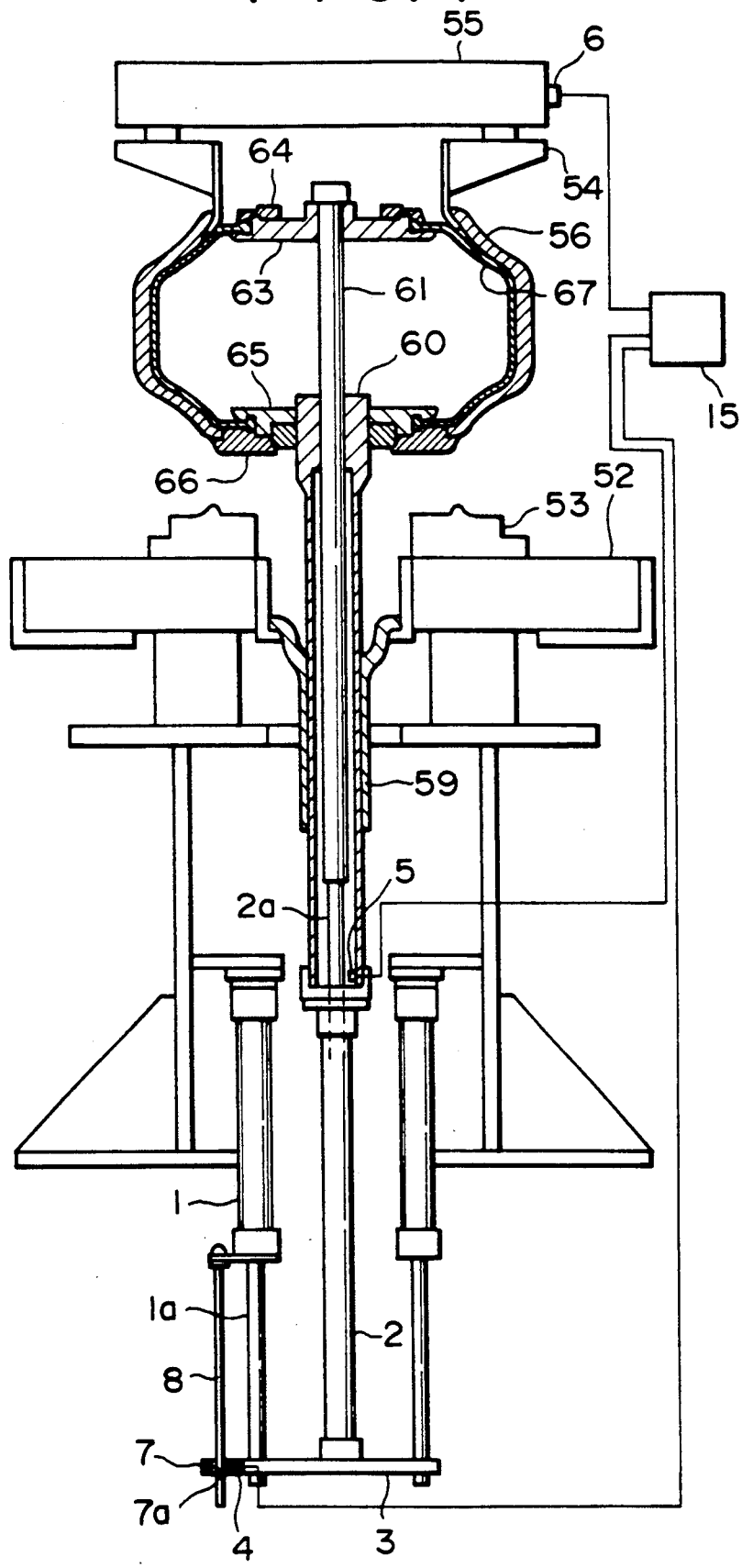
FIG. 1 is a partly sectional front view of a tire vulcanizing machine in a preferred embodiment according to the present invention.

Referring to FIG. 1, the tire vulcanizing machine is provided in its power portion with first cylinder actuators 1 and a second cylinder actuator 2. The second cylinder actuator 2 is connected to the respective extremities of the piston rods 1a of the first cylinder actuators 1 by a connecting member 3, and a lifting cylinder actuator 60 is connected to the upper end of the cylinder of the second cylinder actuator 2 so that the lifting cylinder 60 is moved vertically together with its piston rod 61 by extending or retracting the piston rods 1a of the first cylinder actuators 1, and the piston rod 61 can vertically be moved relative to the cylinder of the cylinder actuator 60 by extending or retracting the piston rod 2a of the second cylinder actuator 2. A first position detector 4 for detecting the stroke of the piston rod 1a of the first cylinder actuator 1 is placed in connection with the first cylinder actuator 1, and a second position detector 5 for detecting the stroke of the piston rod 2a of the second cylinder actuator 2 is placed in connection with the second cylinder actuator 2. A third position detector 6 for detecting the vertical position of a loader 55 provided with a chuck 54 for loading a green tire 56 on a bottom mold 53 is placed in connection with the loader 55. A measuring member 7 provided with a through hole 7a is fixed to the connecting member 3 so as to enable a rod 8 suspended from the cylinder of the first cylinder actuator 1 to move vertically through the through hole 7a.

Figure 2:
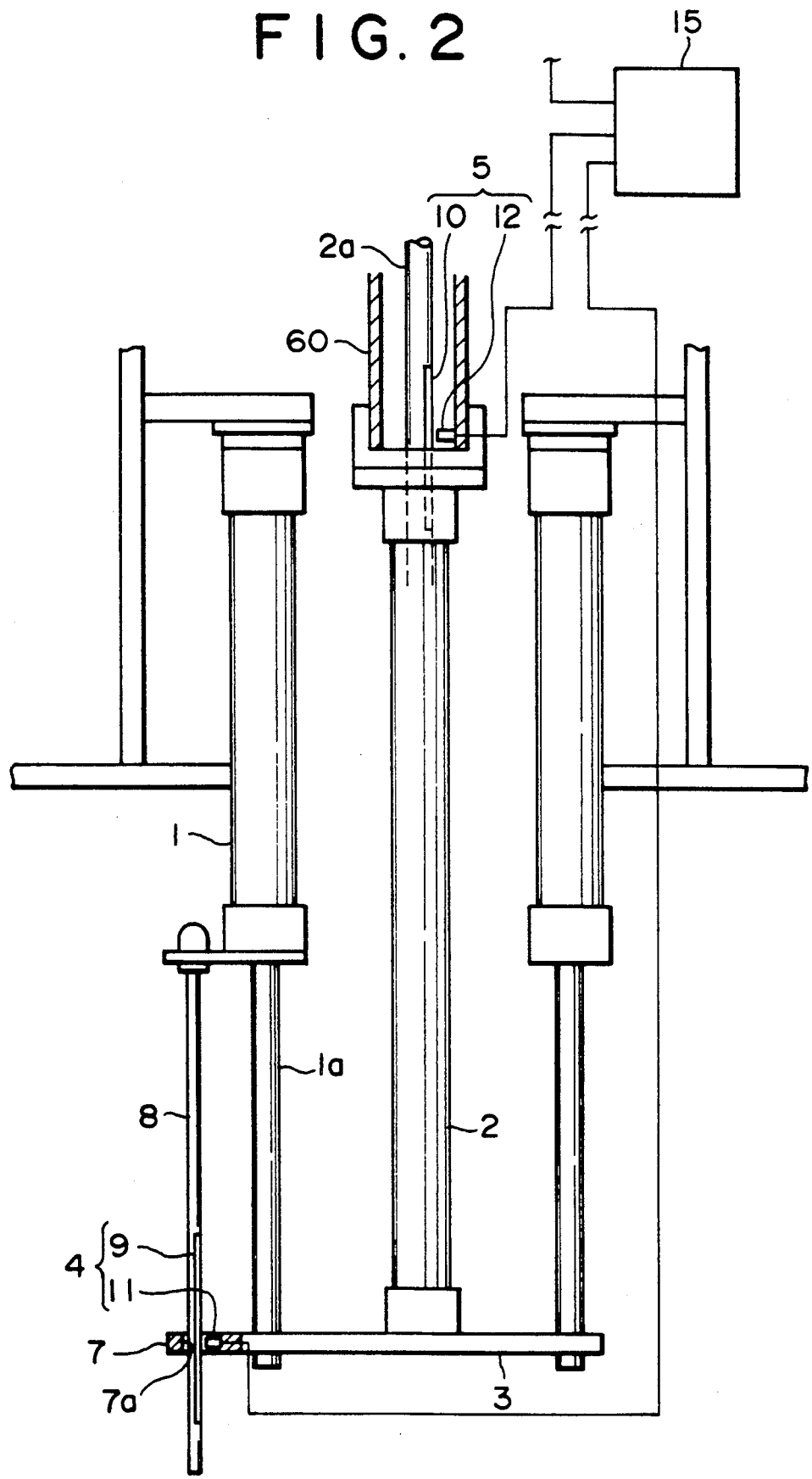
FIG. 2 is a partly sectional front view of an essential portion of the tire vulcanizing machine of FIG. 1.

As shown in FIG. 2, the first position detector 4 comprises a magnetic scale 9 and a magnetic sensor 11, and the second position detector 5 comprises a magnetic scale 10 and a magnetic sensor 12. Each of the magnetic scales 9 and 10 is formed by recording a permanent magnetization pattern of a fixed wavelength on a ferromagnetic alloy tape. The magnetic scale 9 is attached axially to the side surface of the rod 8, and the magnetic scale 10 is attached axially to the side surface of the piston rod 2a of the second cylinder actuator 2. The magnetic sensors 11 and 12 are magnetic flux detectors. The magnetic sensors 11 and 12 detect the magnetization patterns of the magnetic scales 9 and 10 to detect the strokes of the piston rods 1a and 2a of the cylinder actuators 1 and 2, respectively. The magnetic sensor 11 is provided in the measuring member 7, and the magnetic sensor 12 is provided at the lower end of the cylinder of the lifting cylinder 60. Detection signals provided by the magnetic sensors 11 and 12 representing the respective strokes of the piston rods 1a of the first cylinder actuator and the piston rod 2a of the second cylinder actuator 2 are given to a controller 15 for controlling the respective strokes of the piston rod 1a of the first cylinder actuator 1 and the piston rod 2a of the second cylinder actuator 2.

Referring again to FIG. 1, the third position detector 6 placed in connection with the loader 55 is an eddy current or ultrasonic noncontact distance sensor for detecting the vertical position of the loader 55. A detection signal provided by the third position detector 6 representing a vertical position of the loader 55 is given to the controller 15, and then the controller 15 controls a loader lifting mechanism, not shown, to position the loader 55 properly.

The green tire shaping operation of the tire vulcanizing machine will be described hereinafter with reference to FIGS. 3(a), 3(b) and 3lc). As shown in FIG. 3(a), the bladder 67 is extended in a taut state coaxially with the bottom mold 53 by setting the lifting cylinder actuator 60 at its lowermost position and extending the piston rod 61 to position the upper clamping ring 63 at its uppermost position. Then the controller 15 controls the loader lifting mechanism according to the detection signal provided by the distance sensor 6 to lower the loader 55 holding a green tire 56 with the chuck 54 so that the green tire 56 is located with its horizontal center plane in coincidence substantially with the middle point between the upper and lower ends of the extended bladder 67 as shown in FIG. 3(b). Then, a pressurized fluid is supplied into the bladder 67 to expand the bladder 67 horizontally and the upper clamping ring 63 and the lower clamping ring 65 are moved synchronously toward each other and, consequently, the bladder 67 conforms to the inner surface of the green tire 56 as shown in FIG. 3(c). When the piston rods 1a of the first cylinder actuator 1 are retracted to raise the lifting cylinder actuator 60 in synchronously moving the upper clamping ring 63 and the lower clamping ring 65 upward, the piston rod 61 moves upward. Therefore, the piston rod 2a of the second cylinder actuator 2 must be retracted at a retracting speed twice that of the piston rods 1a of the first cylinder actuators 1 to lower the upper clamping ring 63 and to raise the lower clamping ring 65 respectively at equal speeds. The controller 15 controls the retracting speeds of the piston rods 1a of the first cylinder actuators 1 and the piston rod 2a of the second cylinder actuator 2 on the basis of the respective strokes of the piston rods 1a of the first cylinder actuators 1 and the piston rod 2a of the second cylinder actuator 2 detected respectively by the magnetic sensors 11 and 12 so that the retracting speed of the piston rod 2a of the second cylinder actuator 2 is twice that of the piston rods 1a of the first cylinder actuators 1. The upper clamping ring 63 and the lower clamping ring 65 are moved toward each other until the lower bead ring 66 comes into contact with the lower bead 56a of the green tire 56, and then the bladder is expanded so as to be in close contact with the inner surface of the green tire 56 for shaping.

Upon the completion of shaping, the controller 15 controls the extension of the piston rods 1a of the first cylinder actuators 1 and the operation of the loader lifting mechanism according to the stroke of the piston rods 1a of the first cylinder actuators 1 detected by the magnetic sensor 11 and the vertical position of the loader 55 so that the loader 55, the upper clamping ring 63 and the lower clamping ring 65 are lowered synchronously to seat the green tire 56 held by the chuck 54 of the loader 55 on the bottom mold 53. After the green tire 56 has been seated on the bottom mold 53, a top mold, not shown, is joined to the bottom mold 53, and then the green tire 56 is vulcanized. Since the bladder 67 is extended axially, the pressurized fluid is supplied into the bladder 67 to expand the bladder 67, and the upper clamping ring 63 and the lower clamping ring 65 are moved synchronously toward each other as the bladder 67 is expanded so that the horizontal center plane of the green tire 56 held by the chuck 54 of the loader 55 is maintained in coincidence with the middle point between the upper and lower ends of the bladder 67, the bladder 67 is expanded symmetrically with respect to its horizontal center plane similarly to a bladder expanded in the center shaping mode, so that the green tire 56 is shaped perfectly symmetrically. Thus a tire of a high quality can be produced at a relatively low cost.

As shown in FIG. 4, the tire shaping machine may be provided with stabilizing members 20 capable of being moved toward and away from the green tire 56 held by the chuck 54 of the loader 55 to stabilize the green tire 56 during shaping. During the shaping process, the stabilizing members 20 are set in contact with the outer surface of the green tire 56 located with its horizontal center plane in coincidence with the middle point between the upper and lower ends of the bladder 67 to hold the green tire securely in place during the shaping process, which will further improve the quality of the tire.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. A tire vulcanizing machine comprising:
  a bladder;
  a lower clamping ring for holding the bladder at the lower end thereof;
  an upper clamping ring for holding the bladder at the upper end thereof;
  a lower bead ring for fastening the lower end of the bladder to the lower clamping ring;
  an upper bead ring for fastening the upper end of the bladder to the upper clamping ring;
  a first lifting mechanism for vertically moving the lower clamping ring;
  a second lifting mechanism for vertically moving the upper clamping ring;
  a loader provided with a chuck, for disposing a green tire held by the chuck so as to surround the bladder extended between the upper and lower clamping rings and for locating the green tire so that the horizontal center plane thereof coincides with the middle point between the upper and lower ends of the bladder;
  a third lifting mechanism for vertically moving the loader; and
  a controller for controlling the operation of the first, second and third lifting mechanisms;
  wherein a first position detecting means is placed in connection with the first lifting mechanism to detect the stroke of the first lifting mechanism, a second position detecting means is placed in connection with the second lifting mechanism to detect the stroke of the second lifting mechanism, a third position detecting means is placed in connection with the loader to detect the vertical position of the loader, and the controller controls the operation of the first and second lifting mechanisms according to detection signals provided by the first and second position detecting means so that the upper and lower clamping rings are moved synchronously toward each other respectively at equal moving speeds and the horizontal center plane of the green tire held on the loader is kept in coincidence with the middle point between the upper and lower ends of the bladder as the bladder is inflated.

2. A method of shaping a green tire on a tire vulcanizing machine comprising a bladder, a vertically movable lower clamping ring, a vertically movable upper clamping ring, a lower bead ring fastening the lower end of the bladder to the lower clamping ring, an upper bead ring fastening the upper end of the bladder to the upper clamping ring, and a loader for holding a green tire, said method comprising steps of:
  extending the bladder between the upper and lower clamping rings;
  placing the green tire held by the loader so as to surround the bladder extended between the upper and lower clamping rings with the horizontal center plane of the green tire in coincidence with the middle point between the upper and lower ends of the bladder;
  supplying a pressurized fluid into the bladder to expand the bladder so that the bladder conforms to the inner surface of the green tire to shape the green tire;
  detecting the positions of the upper and lower clamping rings; and
  moving the upper and lower clamping rings synchronously toward each other respectively at equal moving speeds as the bladder is expanded and in accordance with the detected positions thereof so that the middle point between the upper and lower ends of the bladder is kept in coincidence with the horizontal center plane of the green tire, and the upper and lower clamping rings and the loader holding the green tire are lowered simultaneously to seat the green tire on a bottom mold for vulcanization after the green tire has been shaped.

3. The method of claim 2 including the steps of detecting the vertical position of the loader.

* * * * *